(12) United States Patent
Wentz et al.

(10) Patent No.: US 11,104,225 B2
(45) Date of Patent: *Aug. 31, 2021

(54) TRANSFER CASE WITH RANGE AND MODE ACTUATOR HAVING CAM FOLLOWER MECHANISM TO OVERCOME BLOCKED SHIFT EVENTS AND SENSOR CONFIGURATION PERMITTING DETECTION OF FORK POSITIONS

(71) Applicant: BorgWarner Inc., Auburn Hills, MI (US)

(72) Inventors: Travis J. Wentz, Rochester, MI (US); Christopher A. Chirco, Romeo, MI (US); Ryo Takagi, West Bloomfield, MI (US)

(73) Assignee: BorgWarner Inc., Auburn Hills, MI (US)

( * ) Notice: Subject to any disclaimer, the term of this patent is extended or adjusted under 35 U.S.C. 154(b) by 530 days.

This patent is subject to a terminal disclaimer.

(21) Appl. No.: 15/947,918

(22) Filed: Apr. 9, 2018

(65) Prior Publication Data

US 2019/0308499 A1    Oct. 10, 2019

(51) Int. Cl.
*B60K 17/00* (2006.01)
*B60K 17/346* (2006.01)
*B60K 17/35* (2006.01)
*F16H 59/68* (2006.01)
*F16H 61/32* (2006.01)
(Continued)

(52) U.S. Cl.
CPC ...... *B60K 17/3467* (2013.01); *B60K 17/3462* (2013.01); *B60K 17/35* (2013.01); *F16H 59/68* (2013.01); *F16H 61/32* (2013.01); *F16H 63/18* (2013.01); *F16H 63/304* (2013.01);
(Continued)

(58) Field of Classification Search
CPC ........... B60K 17/3467; B60K 17/3462; B60K 17/35; B60K 2023/0858; B60K 2023/0825; B60K 17/344; B60K 23/08; F16H 59/68; F16H 61/32; F16H 63/304; F16H 63/32; F16H 63/18; F16H 55/30; F16H 7/06;
(Continued)

(56) References Cited

U.S. PATENT DOCUMENTS

3,898,401 A    8/1975  Noba et al.
4,280,583 A *  7/1981  Stieg ................... B60K 17/346
                                                 180/250
(Continued)

*Primary Examiner* — Victor L MacArthur
(74) *Attorney, Agent, or Firm* — Burris Law, PLLC (57) ABSTRACT

A transfer case with an actuator for operating a two-speed transmission (i.e., range mechanism) and a clutch (i.e., mode mechanism). The actuator employs a motor-driven cam structure that coordinates the movement of a first fork, which is associated with the range mechanism, and a second fork that is associated with the mode mechanism. A resilient coupling is employed to provide compliance between the motor and the cam structure in the event that tooth-on-tooth contact inhibits the range mechanism from changing from a high-range mode and a low range mode or tooth-on-tooth contact inhibits the mode mechanism from changing between a two-wheel drive mode and a four-wheel drive mode. A sensor target and sensor are employed to identify the rotational positioning of the cam structure placement, which is indicative of the modes in which the transmission and the clutch are operating.

8 Claims, 4 Drawing Sheets

(51) Int. Cl.
*F16H 63/30* (2006.01)
*F16H 63/32* (2006.01)
*G01D 5/14* (2006.01)
*F16H 63/18* (2006.01)
*F16H 55/30* (2006.01)
*F16H 7/06* (2006.01)

(52) U.S. Cl.
CPC ............. *F16H 63/32* (2013.01); *G01D 5/145* (2013.01); *F16H 7/06* (2013.01); *F16H 55/30* (2013.01)

(58) Field of Classification Search
CPC .. F16H 2063/3056; G01D 5/145; G01D 5/12; B60Y 2400/405
USPC ............... 340/456; 180/233–251; 74/115.02, 74/337.5, 473.37
See application file for complete search history.

(56) References Cited

U.S. PATENT DOCUMENTS

| | | | | |
|---|---|---|---|---|
| 4,462,271 | A * | 7/1984 | Stieg | B60K 17/346 180/250 |
| 4,664,217 | A * | 5/1987 | Welch | B60K 17/344 180/247 |
| 5,584,776 | A * | 12/1996 | Weilant | B60K 17/3505 475/213 |
| 5,680,308 | A * | 10/1997 | Warren | B60K 23/08 701/69 |
| 5,699,870 | A * | 12/1997 | Warren | F16H 61/32 180/247 |
| 5,878,624 | A | 3/1999 | Showalter et al. | |
| 6,211,794 | B1 | 4/2001 | DeSoto | |
| 10,703,203 | B2 * | 7/2020 | Legault | F16H 63/3043 |
| 2004/0139795 | A1 * | 7/2004 | Kawakubo | B62M 25/06 73/115.03 |
| 2007/0175286 | A1 | 8/2007 | Oliveira et al. | |
| 2011/0100144 | A1 * | 5/2011 | Neelakantan | F16H 61/688 74/473.36 |
| 2013/0308500 | A1 * | 11/2013 | Shaw | H04W 4/16 370/270 |
| 2014/0338484 | A1 * | 11/2014 | Maki | F16H 63/3441 74/337.5 |

* cited by examiner

TRANSFER CASE WITH RANGE AND MODE ACTUATOR HAVING CAM FOLLOWER MECHANISM TO OVERCOME BLOCKED SHIFT EVENTS AND SENSOR CONFIGURATION PERMITTING DETECTION OF FORK POSITIONS

FIELD

The present disclosure relates to a transfer case with a range and mode actuator. The actuator employs a follower mechanism that overcomes blocked shift events, as well as a sensor configuration that permits detection of the range and mode forks at various fork positions.

BACKGROUND

This section provides background information related to the present disclosure which is not necessarily prior art.

Transfer cases are commonly configured with a multi-speed transmission, which permits the transfer case to be selectively operated in a high-speed condition or a low-speed condition, and a clutch that permits the transfer case to be selectively operated in a two-wheel drive mode or a four-wheel drive mode. In situations where switching between high and low-speed conditions and/or between two and four-wheel drive modes involves the movement of a first mechanical element and its engagement to a second mechanical element, engagement between the two mechanical elements can occur when the teeth of one mechanical element axially abut the teeth of the other mechanical element. To avoid stress on the motor that are employed to drive the mechanical elements together, it can be advantageous to provide compliance, usually in the form of a coil spring, that can be employed to store energy to move the movable mechanical element when tooth-on-tooth contact (i.e., a blocked shift) occurs. As such, it is not uncommon to integrate compliance springs into an actuator assembly that controlled the operation of a multi-speed transmission and a clutch. Moreover, it is not uncommon to include one or more biasing springs to bias the movable mechanical elements toward a desired position.

The use of biasing spring and multiple compliance springs adds cost to a transfer case, as well as complexity in the design. Moreover, the rotational position of the output shaft cannot be employed to determine the operating condition of the multi-speed transmission or the clutch. Consequently, there remains a need in the art for a transfer case having an actuator for controlling operation of a multi-speed transmission and a clutch that utilizes fewer springs for biasing and compliance, and which provides an accurate and reliable means for determining the locations of the movable elements that control the operation of the multi-speed transmission and the clutch.

SUMMARY

This section provides a general summary of the disclosure, and is not a comprehensive disclosure of its full scope or all of its features.

In one form, the present teachings provide a transfer case that includes a housing and an actuator. The actuator includes a motor and cam assembly, a fork shaft, a first fork, a second fork, a sensor target and a sensor. The motor and cam assembly is coupled to the housing and has a motor, a cam structure and a resilient rotary coupling. The cam structure is driven about a cam axis by the motor through the resilient rotary coupling. The cam structure defines first and second cam tracks. The fork shaft is coupled to the housing and extends along a fork shaft axis that is parallel to the cam axis. The first fork is received in the housing and has a first mount, a first fork member and a first cam follower. The first mount is received on the fork shaft for sliding movement along the fork shaft axis. The first fork member extends from the first mount and has a pair of first fork tines that are disposed about an actuation axis that is parallel to the fork shaft axis. The first cam follower is coupled to the first mount and is received into the first cam track such that rotation of the cam structure about the cam axis between a first rotary cam position, a second rotary cam position and a third rotary cam position causes corresponding translation of the first fork along the actuation axis between a first position, a second position and a third position, respectively. The second fork is received in the housing and has a second mount, a second fork member and a second cam follower. The second mount is received on the fork shaft for sliding movement along the fork shaft axis. The second fork member extends from the second mount and has a pair of second fork tines that are disposed about an actuation axis that is parallel to the fork shaft axis. The second cam follower is coupled to the first mount and is received into the second cam track such that rotation of the cam structure about the cam axis between a fourth rotary cam position and a fifth rotary cam position causes corresponding translation of the second fork along the actuation axis between a third position and a fourth position, respectively. The sensor target is coupled to the cam structure for rotation therewith and defines a target profile with a plurality of different rotary plateaus. The sensor senses the target profile and responsively generates a sensor signal.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
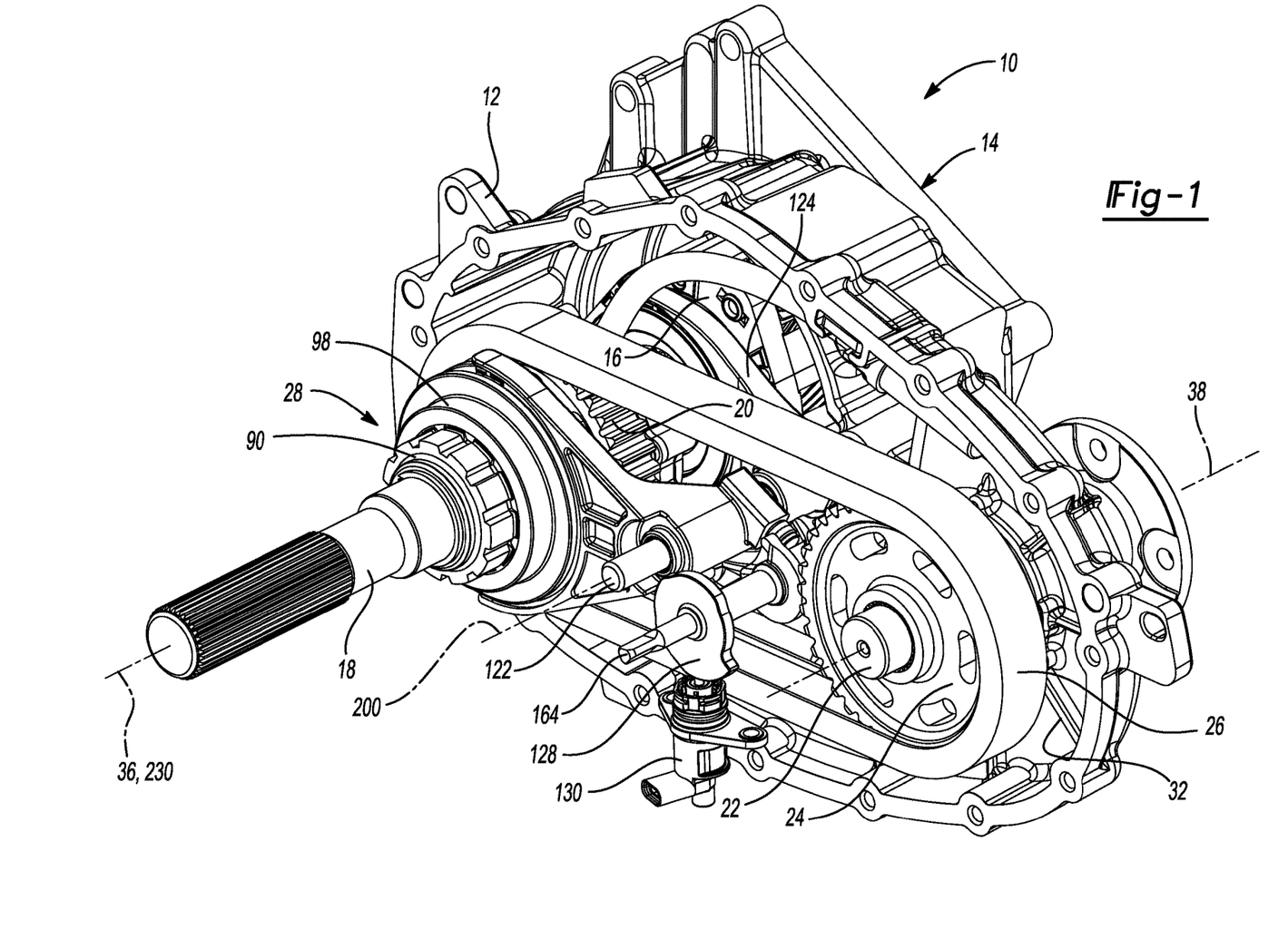
FIG. 1 is a perspective view of a portion of an exemplary transfer case constructed in accordance with the teachings of the present disclosure, the transfer case being shown with a portion of a housing removed.
Figure 2:
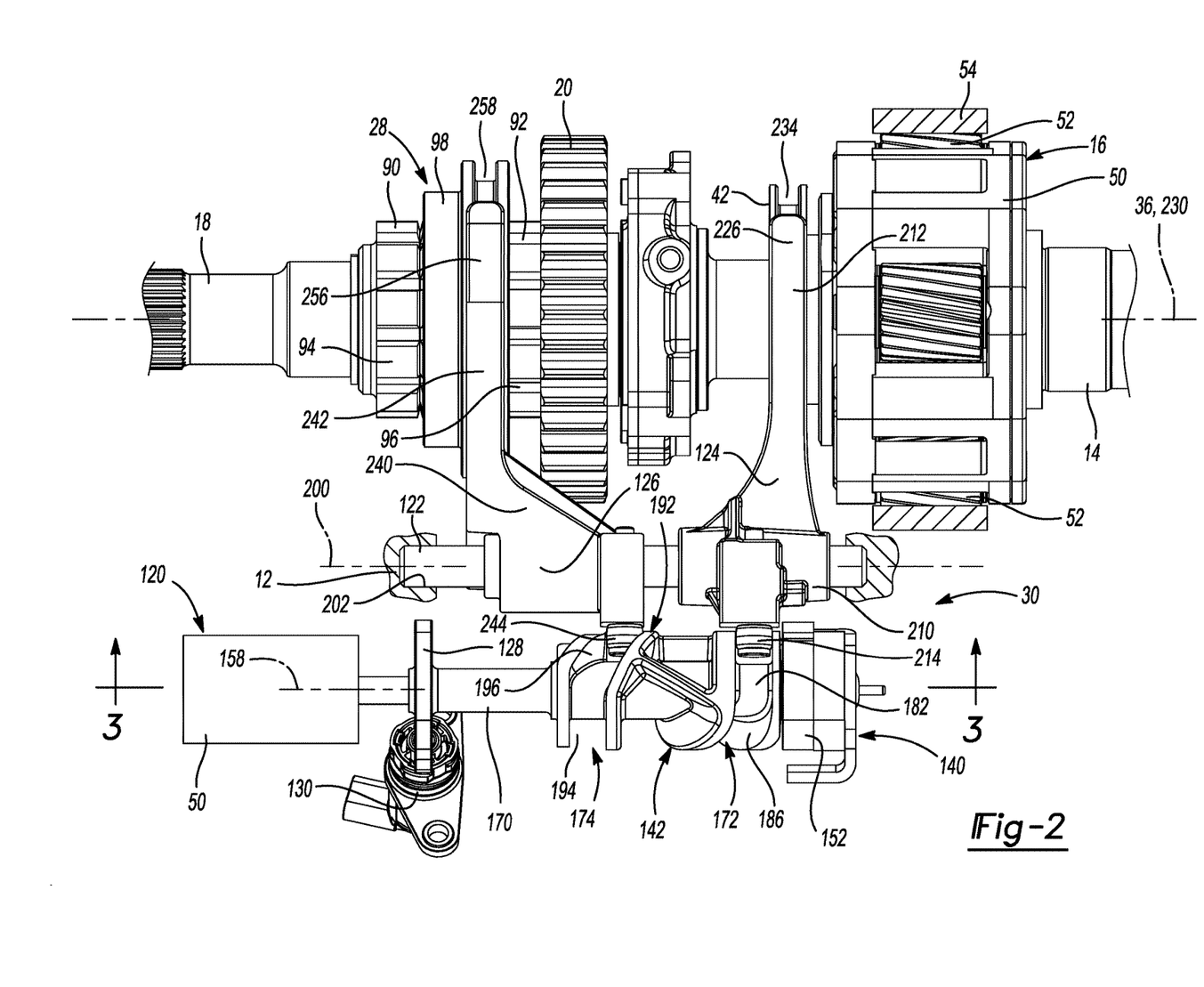
FIG. 2 is a plan view of a portion of the transfer case of FIG. 1.

With reference to FIGS. 1 and 2, an exemplary transfer case constructed in accordance with the teachings of the present disclosure is generally indicated by reference numeral 10. The transfer case 10 can include a housing 12, an input shaft 14, a two-speed transmission 16, a first output shaft 18, a first sprocket 20, a second output shaft 22, a second sprocket 24, a chain 26, a clutch 28 and an actuator 30. The housing 12 can be formed in halves (only one is shown) that can cooperate to define an internal cavity 32. The input shaft 14 can extend into the internal cavity 32 and can be supported by the housing 12 for rotation about a primary axis 36. The first output shaft 18 can be received in the internal cavity 32 and can be supported by the housing 12 for rotation about the primary axis 36. The second output shaft 22 can be received in the internal cavity 32 and can be supported by the housing 12 for rotation about a secondary axis 38 that can be spaced apart from the primary axis 36. The primary and secondary axes 36 and 38 can be parallel to one another.

With reference to FIG. 2, the two-speed transmission 16 can have a transmission input member (not specifically shown), which can be coupled to the input shaft 14 for rotation therewith, and a transmission output member 42 that can be coupled to the first output shaft 18 for rotation therewith. In the example provided, the two-speed transmission 16 is a planetary transmission having a planet carrier 50 and the transmission output member 42 is movable along the primary axis 36 between a high-range position, in which the transmission output member 42 couples the first output shaft 18 to the input shaft 14 for rotation therewith to permit the two-speed transmission 16 to operate in a high-speed mode, and a low-range position in which the transmission output member 42 couples the first output shaft 18 to the planet carrier 50 for rotation therewith that permits the two-speed transmission 16 to operate in a low-speed mode. The planet carrier 50 is driven by a sun gear (not specifically shown), which is coupled for rotation with the input shaft 14, through a plurality of planet gears 52 that are meshed with the sun gear and a ring gear 54 to provide a gear reduction between the input shaft 14 and the transmission output member 42.

Returning to FIG. 1, the first sprocket 20 can be rotatably disposed on the first output shaft 18, while the second sprocket 24 can be non-rotatably coupled to the second output shaft 22. The chain 26 can be disposed around and can engage the first and second sprockets 20 and 24 to permit rotary power to be transmitted between the first and second sprockets 20 and 24.

In FIGS. 1 and 2, the clutch 28 can be any type of clutch or coupling that can be employed to selectively transmit rotary power between the first output shaft 18 and the first sprocket 20. In this regard, the clutch 28 can have a first clutch member 90, which can be coupled to the first output shaft 18 for rotation therewith, and a second clutch member 92 that can be coupled to the first sprocket 20 for rotation therewith. The clutch 28 can be selectively operated in a first clutch mode (i.e., two-wheel drive mode), in which the first and second clutch members 90 and 92 are rotationally de-coupled from one another to thereby inhibit the transmission of rotary power between the first input shaft 14 and the first sprocket 20, and a second clutch mode (i.e., four-wheel drive mode) in which the first and second clutch members 90 and 92 are rotationally coupled to one another to thereby permit the transmission of rotary power between the first input shaft 14 and the first sprocket 20. In the particular example provided, the first clutch member 90 is splined to the first input shaft 14 and includes external teeth 94, the second clutch member 92 is integrally formed with the first sprocket 20 and includes external teeth 96, and the clutch 28 includes a sleeve-shaped third clutch member 98 with internal teeth (not specifically shown) that permit the third clutch member 98 to be non-rotatably but axially slidably coupled to the second clutch member 92 (via engagement of the internal teeth with the external teeth 96) and selectively movable into a position where the third clutch member 98 additionally engages the first clutch member 90 (via engagement of the internal teeth with the external teeth 94) when the clutch 28 is operated in the second clutch mode. While the third clutch member 98 has been described as being engaged to the second clutch member 92 and movable into a position where it is also engaged to the first clutch member 90, it will be appreciated that the third clutch member 98 could be engaged to the first clutch member 90 and movable into a position where it is also engaged to the second clutch member 92.

Figure 3:
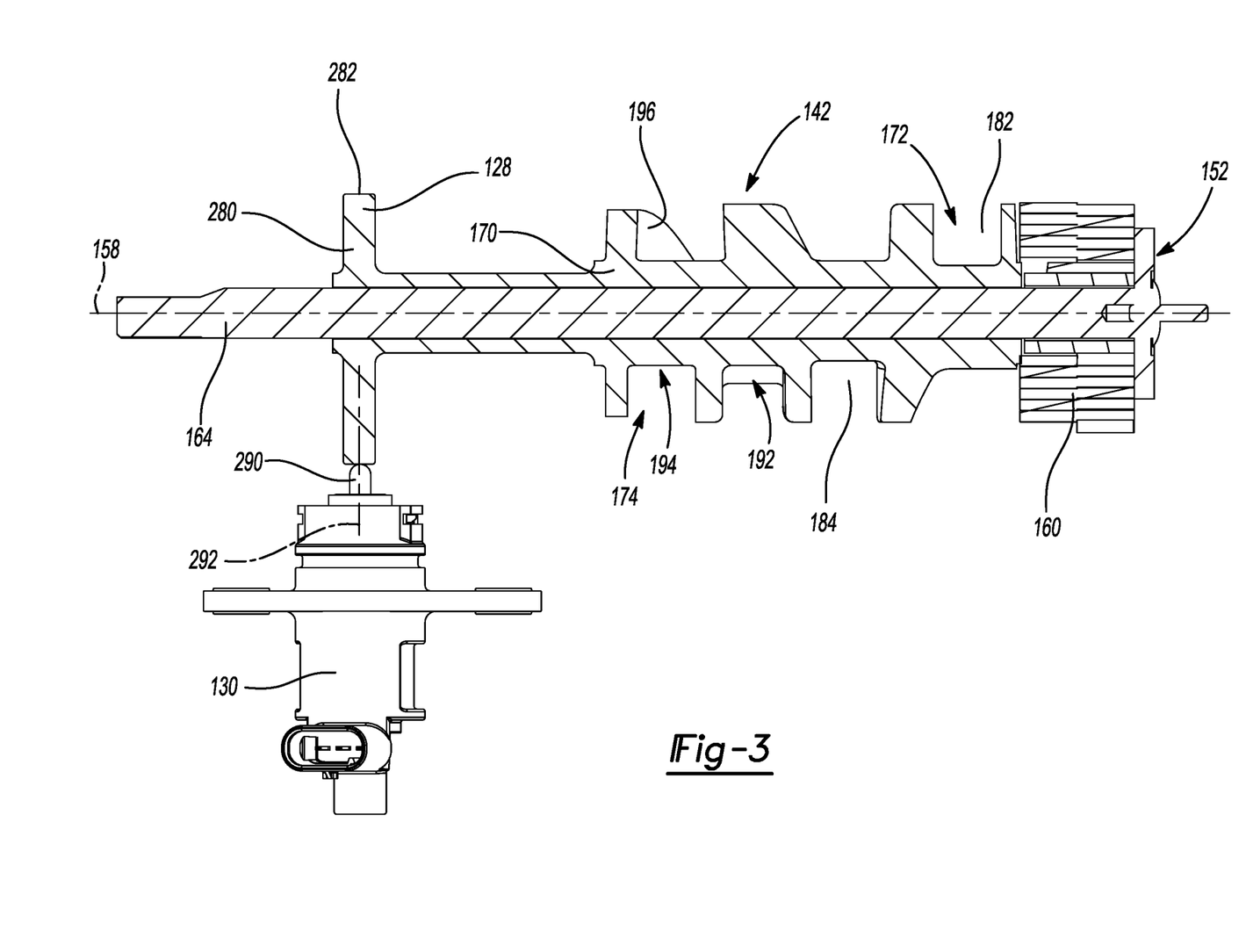
FIG. 3 is a section view taken along the line 3-3 showing of a portion of an actuator.

With reference to FIGS. 2 and 3, the actuator 30 can include a motor and cam assembly 120, a fork shaft 122, a first fork 124, a second fork 126, a sensor target 128 and a sensor 130. The motor and cam assembly 120 can be coupled to the housing 12 (FIG. 1) and can include a motor assembly 140 and a cam structure 142. The motor assembly 140 can be configured in a manner that is described in commonly assigned U.S. Pat. No. 5,584,776. Briefly, the motor assembly 140 can have a motor 150 and a resilient rotary coupling 152. The motor 150 can drive the cam structure 142 about a cam axis 158 through the resilient rotary coupling 152. The resilient rotary coupling 152 can include a torsion spring 160 and is configured to permit rotation of the output shaft of the motor 150 relative to the cam structure 142 in instances where movement of the transmission output member 42 into the low-range position is inhibited due to tooth-on-tooth contact between mating teeth (not shown) on the transmission output member 42 and the planet carrier 50 or in instances where movement of the third clutch member 98 into engagement with the first clutch member 90 is inhibited due to tooth-on-tooth contact between the first and third clutch members 90 and 98. In the example provided, the cam structure 142 is received coaxially over an intermediate shaft 164 that is driven by the motor 150 and the torsion spring 160 is disposed in a torque transmission path between the intermediate shaft 164 and the cam structure 142.

The cam structure 142 can have a body 170 that can extend along the cam axis 158 and define a first cam track 172 and a second cam track 174. The first cam track 172 can have a first track portion 182, a second track portion 184, which is spaced apart from the first track portion 182 along the cam axis 158, and a first track connecting portion 186 that spirals along and about the cam axis 158 to connect the first and second track portions 182 and 184. In the example provided, each of the first and second track portions 182 and 184 extend solely about a portion of the circumference of the body 170 and do not spiral along the cam axis 158. Similarly, the second cam track 174 can have a third track portion 192, a fourth track portion 194, which is spaced apart from the third track portion 192 along the cam axis 158, and a second track connecting portion 196 that spirals along and about the cam axis 158 to connect the third and fourth track portions 192 and 194.

With reference to FIGS. 1 and 2, the fork shaft 122 can be fixedly coupled to the housing 12 in any desired manner and can extend along a fork shaft axis 200 that is parallel to the cam axis 158. In the example provided, the opposite axial ends of the fork shaft 122 are received into holes 202 formed in the housing 12 such that the housing 12 captures the fork shaft 122 in a manner that limits or inhibits movement of the fork shaft 122 relative to the housing 12 along the fork shaft axis 200.

The first fork 124 is received in the housing 12 and has a first mount 210, a first fork member 212, and a first cam follower 214. The first mount 210 is received on the fork shaft 122 for sliding movement along the fork shaft axis 200. The first fork member 212 extends from the first mount 210 and can engage the transmission output member 42 in a manner that inhibits relative axial movement there between but which permits rotation of the transmission output member 42 relative to the first mount 210. The first fork member 212 can be a generally U-shaped or C-shaped structure having a pair of first fork tines 226 that can be disposed about an actuation axis 230 that is coincident with the primary axis 36 and parallel to the fork shaft axis 200. In the particular example provided, the first fork tines 226 have projections (not shown) that are received into an annular groove 234 that is formed into the transmission output member 42. It will be appreciated that receipt of the first fork tines 226 into the annular groove 234 permits relative rotation between the transmission output member 42 and the first fork 124 while limiting or inhibiting relative axial movement between the first fork 124 and the transmission output member 42 along the primary axis 36. The first cam follower 214 can be coupled to the first mount 210 and can be received into the first cam track 172 such that rotation of the cam structure 142 about the cam axis 158 between a first rotary cam position, a second rotary cam position and a third rotary cam position that causes corresponding translation of the first fork 124 along the fork shaft axis 200 and the actuation axis 230 between a first position, in which the transmission output member 42 is disposed in the low-range position, a second position, in which the transmission output member 42 is disposed in a neutral position in which the transmission output member 42 is rotatably decoupled from both the input shaft 14 and the planet carrier 50, and a third position in which the transmission output member 42 is disposed in the high-range position, respectively.

The second fork 126 is received in the housing 12 and can have a second mount 240, a second fork member 242, and a second cam follower 244. The second mount 240 is received on the fork shaft 122 for sliding movement along the fork shaft axis 200. The second fork member 242 extends from the second mount 240 and can engage the third clutch member 98 in a manner that inhibits relative axial movement there between but which permits rotation of the third clutch member 98 relative to the second mount 240. The second fork member 242 can be a generally U-shaped or C-shaped structure having a pair of second fork tines 256 that can be disposed about the actuation axis 230. In the particular example provided, the second fork tines 256 define a pair of circumferentially extending projections that are received into which a circumferentially extending groove 258 on the outside surface of the third clutch member 98. It will be appreciated that receipt of the circumferentially extending projections into the circumferentially extending groove 258 permits relative rotation between the third clutch member 98 and the second fork 126 while limiting or inhibiting relative axial movement between the second fork 126 and the third clutch member 98 along the primary axis 36. The second cam follower 244 can be coupled to the second mount 240 and can be received into the second cam track 174 such that rotation of the cam structure 142 about the cam axis 158 between a fifth rotary cam position and a sixth rotary cam position that causes corresponding translation of the second fork 126 along the fork shaft axis 200 and the actuation axis 230 between a third position, in which the third clutch member 98 is rotationally de-coupled from the first clutch member 90 so that the clutch 28 operates in the first clutch mode, and a fourth position in which the third clutch member 98 is rotationally coupled to the first clutch member 90 so that the clutch 28 operates in the second clutch mode.

Figure 4:
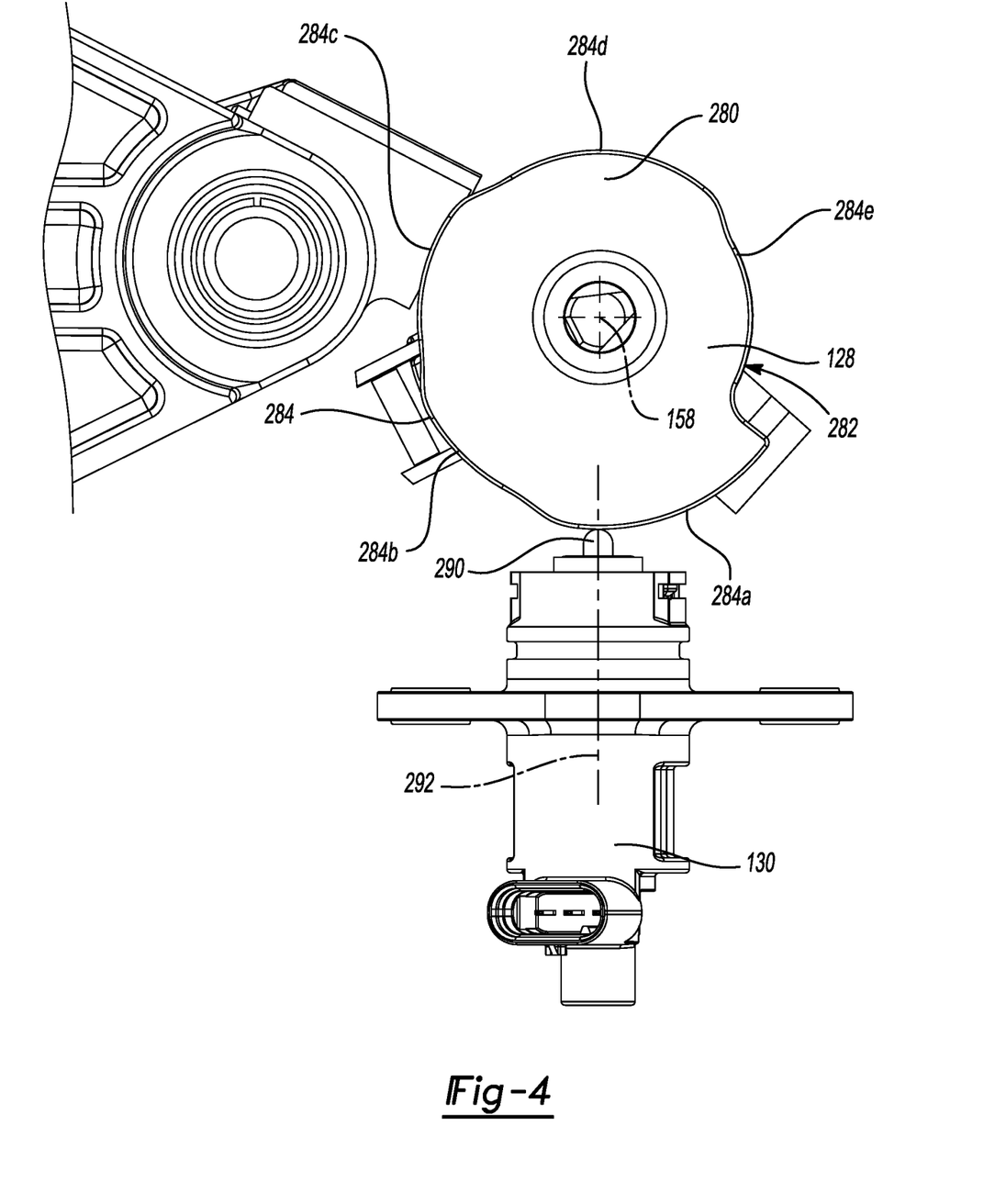
FIG. 4 is a side elevation view of a portion of the transfer case of FIG. 1 illustrating a sensor target and sensor in more detail.

With reference to FIGS. 3 and 4, the sensor target 128 can be coupled to the cam structure 142 for rotation therewith about the cam axis 158. The sensor target 128 can have a target body 280, which can extend radially outwardly from the cam structure 142, and a target profile 282 that can define a target profile 282 that can include a plurality of rotary plateaus 284. In the example provided, the target profile 282 is disposed about the circumference (perimeter) of the target body 280, there are a total of five rotary plateaus 284, and each of the rotary plateaus 284 is disposed radially outwardly from the cam axis 158 by an associated predetermined distance. The distances with which the rotary plateaus 284 are spaced from the cam axis 158 can be staggered in any desired manner, such as a progressively larger distance between a first one of the rotary plateaus 284a and a last one of the rotary plateaus 284e.

The sensor 130 can be fixedly coupled to the housing 12 and can include a sensor probe 290 that is movable along a probe axis 292 that is perpendicular to the target profile 282 (i.e., perpendicular to the cam axis 158 in the example provided). The sensor probe 290 is biased by a spring (not shown) into contact with the target profile 282. The sensor 130 is configured to sense a position of the sensor probe 290 relative to the cam axis 158 and responsively generate a sensor signal. The sensor signal can be an analog signal, such as a voltage that varies as a function of the position of the sensor probe 290 relative to the cam axis 158. Alternatively, the sensor signal could be a digital signal. The digital signal could be representative of a sensed location of the sensor probe 290 (e.g., a fractional value that is based on the distance of the sensor probe 290 from a fully retracted position divided by the maximum travel the sensor probe 290) or could be a value that has been assigned to the positioning of the sensor probe 290 within a predetermined distance (or range of distances) from the cam axis 158.

With reference to FIGS. 2 through 4, the transfer case 10 (FIG. 1) can be operated on a typical or normal basis in the high-range, two-wheel drive mode (i.e., with the transmission output member 42 in the high-range position and the third clutch member 98 is in a position where it is rotatably de-coupled from the first clutch member 90), which is depicted in FIG. 3. To position the transmission output member 42 and the third clutch member 98 in this manner, the cam structure 142 is positioned in a first rotary position that correspondingly positions the first and second cam followers 214 and 244 in the first track portion 182 of the first cam track 172 and the third track portion 192 of the second cam track 174, respectively. Placement of the first cam follower 214 in the first track portion 182 correspondingly positions the first fork 124 at a location along the fork shaft axis 200 that is associated with the placement of the transmission output member 42 in the high-range position. Placement of the second cam follower 244 in the third track portion 192 correspondingly positions the second fork 126 at a location along the fork shaft axis 200 that is associated with the placement of the third clutch member 98 in a position where it is rotatably de-coupled from the first clutch member 90.

Positioning of the cam structure 142 in the first rotary position correspondingly positions the target profile 282 about the cam axis 158 such that the sensor probe 290 is disposed on the first one of the rotary plateaus 284a. Consequently, the sensor 130 will produce a first sensor signal that is indicative of the operation of the transfer case 10 in the high-speed, two-wheel drive mode.

When operation of the transfer case 10 in a high-speed, four-wheel drive mode is desired, the motor 150 can be operated in a first rotational direction to rotate the cam structure 142 from the first rotary position through a second rotary position and into a third rotary position.

Due to the circumferential length of the first track portion 182 of the first cam track 172, rotation of the cam structure 142 from the first rotary position through the second rotary position and into the third rotary position does not cause the first cam follower 214 to move along the fork shaft axis 200 and consequently, the transmission output member 42 is maintained in the high-range position. Rotation of the cam structure 142 from the first rotary position to the second rotary position, however causes the second cam follower 244 to travel out of the third track portion 192 and into the second track connection portion 196 to thereby move the second fork 126 along the shift fork shaft axis 200 in a direction that moves the third clutch member 98 toward the first clutch member 90. Significantly, the third clutch member 98 is not fully engaged to the first clutch member 90 when the cam structure 142 is in the second rotary position.

Positioning of the cam structure 142 in the second rotary position correspondingly positions the target profile 282 about the cam axis 158 such that the sensor probe 290 is disposed on a second one of the rotary plateaus 284b. Consequently, the sensor 130 will produce a second sensor signal that is indicative that the transfer case 10 is operating in the high-speed condition but is shifting between the two- and four-wheel drive modes.

Further rotation of the cam structure 142 from the second rotary position to the third rotary position causes the second cam follower 244 to travel out of the second track connection portion 196 and into the fourth track portion 194 to thereby move the second fork 126 along the fork shaft axis 200 in a direction that moves the third clutch member 98 into full engagement with the first clutch member 90 to permit the clutch 28 to operate in the four-wheel drive mode.

Positioning of the cam structure 142 in the third rotary position correspondingly positions the target profile 282 about the cam axis 158 such that the sensor probe 290 is disposed on a third one of the rotary plateaus 284c. Consequently, the sensor 130 will produce a third sensor signal that is indicative that the transfer case 10 is operating in a high-speed, four-wheel drive mode.

When operation of the transfer case 10 in a low-range, four-wheel drive mode is desired, the motor 150 can be operated in the first rotational direction to rotate the cam structure 142 from the third rotary position through a fourth rotary position and into a fifth rotary position.

Due to the circumferential length of the fourth track portion 194 of the second cam track 174, rotation of the cam structure 142 from the third rotary position through the fourth rotary position and into the fifth rotary position does not cause the second cam follower 244 to move along the fork shaft axis 200 and consequently, the third clutch member 98 is maintained in engagement with the first clutch member 90 so that the clutch 28 operates in the four-wheel drive mode. Rotation of the cam structure 142 from the third rotary position to the fourth rotary position, however causes the first cam follower 214 to travel out of the first track portion 182 and into the first track connection portion 186 to thereby move the first fork 124 along the fork shaft axis 200 in a direction that moves the transmission output member 42 toward a position where it engages the planet carrier 50. Significantly, the transmission output member 42 is not engaged to the planet carrier 50 when the cam structure 142 is in the fourth rotary position.

Positioning of the cam structure 142 in the fourth rotary position correspondingly positions the target profile 282 about the cam axis 158 such that the sensor probe 290 is disposed on a fourth one of the rotary plateaus 284d. Consequently, the sensor 130 will produce a fourth sensor signal that is indicative that the two-speed transmission 16 of the transfer case 10 is in a neutral condition and that the clutch 28 of the transfer case 10 is operating in the four-wheel drive mode.

Further rotation of the cam structure 142 from the fourth rotary position to the fifth rotary position causes the first cam follower 214 to travel out of the first track connection portion 186 and into the second track portion 184 to thereby move the first fork 124 along the fork shaft axis 200 in a direction that moves the transmission output member 42 into full engagement with the planet carrier 50 to permit the two-speed transmission 16 to operate in the low-speed mode.

Positioning of the cam structure 142 in the fifth rotary position correspondingly positions the target profile 282 about the cam axis 158 such that the sensor probe 290 is disposed on a fifth one of the rotary plateaus 284e. Consequently, the sensor 130 will produce a fifth sensor signal that is indicative that the transfer case 10 is operating in a low-speed, four-wheel drive mode.

In instances where tooth-on-tooth contact between the third and first clutch members 98 and 90 prevents the cam structure 142 from being rotated in the first rotary direction into the third rotary position, or where tooth-on-tooth contact between the transmission output member 42 and the planet carrier 50 prevents the cam structure 142 from being rotated into the fifth rotary position, rotation of the intermediate shaft 164 in the first rotational direction (due to the operation of the motor 150) can wind the torsion spring 160 to store energy that can be employed to further rotate the cam structure 142 once tooth-on-tooth contact between the third and first clutch members 98 and 90 or between the transmission output member 42 and the planet carrier 50 has ceased and the mating teeth are aligned to permit relative sliding motion of the third clutch member 98 (to meshingly engage with the first clutch member 90) or the transmission output member 42 (to meshingly engage with the planet carrier 50). Because operating condition of the clutch 28 and the two-speed transmission 16 can be precisely identified by the rotational positioning of the cam structure 142, and because the sensor target 128 is coupled to the cam structure 142 for rotation therewith, the operational state of the transfer case 10 can be precisely identified despite the fact that the torsion spring 160 provides rotational compliance between the motor 150 and the cam structure 142.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A transfer case comprising:
a housing; and
an actuator with a motor and cam assembly, a fork shaft, a first fork, a second fork, a sensor target and a sensor, the motor and cam assembly being coupled to the housing and having a motor, an intermediate shaft, a cam structure and a torsion spring, the motor driving the intermediate shaft about a cam axis, the cam structure being received coaxially over the intermediate shaft, the torsion spring being disposed in a torque transmission path between the intermediate shaft and the cam structure, the cam structure defining first and second cam tracks, the fork shaft being coupled to the housing and extending along a fork shaft axis that is parallel to the cam axis, the first fork being received in the housing and having a first mount, a first fork member and a first cam follower, the first mount being received on the fork shaft for sliding movement along the fork shaft axis, the first fork member extending from the first mount and having a pair of first fork tines that are disposed about an actuation axis that is parallel to the fork shaft axis, the first cam follower being coupled to the first mount and being received into the first cam track such that rotation of the cam structure about the cam axis between a first rotary cam position, a second rotary cam position and a third rotary cam position causes corresponding translation of the first fork along the actuation axis between a first position, a second position and a third position, respectively, the second fork being received in the housing and having a second mount, a second fork member and a second cam follower, the second mount being received on the fork shaft for sliding movement along the fork shaft axis, the second fork member extending from the second mount and having a pair of second fork tines that are disposed about the actuation axis, the second cam follower being coupled to the first mount and being received into the second cam track such that rotation of the cam structure about the cam axis between a fourth rotary cam position and a fifth rotary cam position causes corresponding translation of the second fork along the actuation axis between a third position and a fourth position, respectively, the sensor target being coupled to the cam structure for rotation therewith, the sensor target defining a target profile with a plurality of different rotary plateaus, the sensor sensing the target profile and responsively generating a sensor signal.

2. The transfer case of claim 1, further comprising an input shaft, a two-speed transmission, a first output shaft, a first sprocket, a second output shaft, a second sprocket, a chain, and a clutch, the input shaft and the first output shaft being supported for rotation by the housing, the two-speed transmission being driven by the input shaft and having a transmission output member that is non-rotatably but axially slidably coupled to the first output shaft, the transmission output member being movable along the first output shaft between a high-range position, in which the two-speed transmission operates in a first gear ratio to transmit rotary power between the input shaft and the first output shaft, and a low-range position in which the two-speed transmission operates in a second gear ratio to transmit rotary power between the input shaft and the first output shaft, the first sprocket being rotatably disposed on the first output shaft, the second output shaft being offset from the first output shaft and supported for rotation by the housing, the second sprocket being coupled to the second output shaft for common rotation, the chain being disposed about the first and second sprockets to transmit rotary power therebetween, the clutch having a first clutch member, which is coupled to the first output shaft for rotation therewith, a second clutch member, which is coupled to the first sprocket for rotation therewith, the clutch being operable in a first clutch mode in which the first and second clutch members are rotationally de-coupled from one another to inhibit transmission of rotary power between the first output shaft and the first sprocket, and a second clutch mode in which the first and second clutch members are rotationally coupled to one another to thereby permit transmission of rotary power between the first output shaft and the first sprocket.

3. The transfer case of claim 2, wherein the transmission output member is disposed in the high-range position when the cam structure is disposed in the first rotary cam position, wherein the transmission output member is disposed in a neutral position when the cam structure is disposed in the second rotary cam position, and wherein the transmission output member is disposed in the low-range position when the cam structure is disposed in the third rotary cam position.

4. The transfer case of claim 3, wherein the clutch is operated in the first clutch mode when the cam structure is disposed in the first rotary cam position, and wherein the clutch is operated in the second clutch mode when the cam structure is in either of the second and third rotary cam positions.

5. The transfer case of claim 3, wherein the sensor target is oriented such that that the sensor senses a first one of the rotary plateaus when the cam structure is positioned in the first rotary cam position, wherein the sensor target is oriented such that that the sensor senses a second one of the rotary plateaus when the cam structure is positioned in the second rotary cam position, wherein the sensor target is oriented such that that the sensor senses a third one of the rotary plateaus when the cam structure is positioned in the third rotary cam position, wherein the sensor target is oriented such that that the sensor senses a fourth one of the rotary plateaus when the cam structure is positioned in the fourth rotary cam position, and wherein the sensor target is oriented such that that the sensor senses a fifth one of the rotary plateaus when the cam structure is positioned in the fifth rotary cam position.

6. The transfer case of claim 5, wherein the fourth and fifth rotary cam positions of the cam structure are located between the first and second rotary cam positions of the cam structure.

7. The transfer case of claim 2, wherein the clutch comprises a third clutch member that is non-rotatably but axially slidably coupled to one of the first and second clutch members, the third clutch member being movable into engagement with the other one of the first and second clutch members when the clutch operates in the second clutch mode.

8. The transfer case of claim 1, wherein each of the first and second cam tracks has a first track portion, a second track portion that is spaced apart from the first track portion along the cam axis, and a track connecting portion that spirals along and about the cam axis to connect the first and second track portions.

* * * * *